May 11, 1937.   M. W. BOWEN   2,080,196
BRAKING MECHANISM
Filed March 9, 1932   2 Sheets-Sheet 1

Inventor:
Myron W. Bowen
By Williams, Bradbury,
McCaleb & Hinkle, Attys.

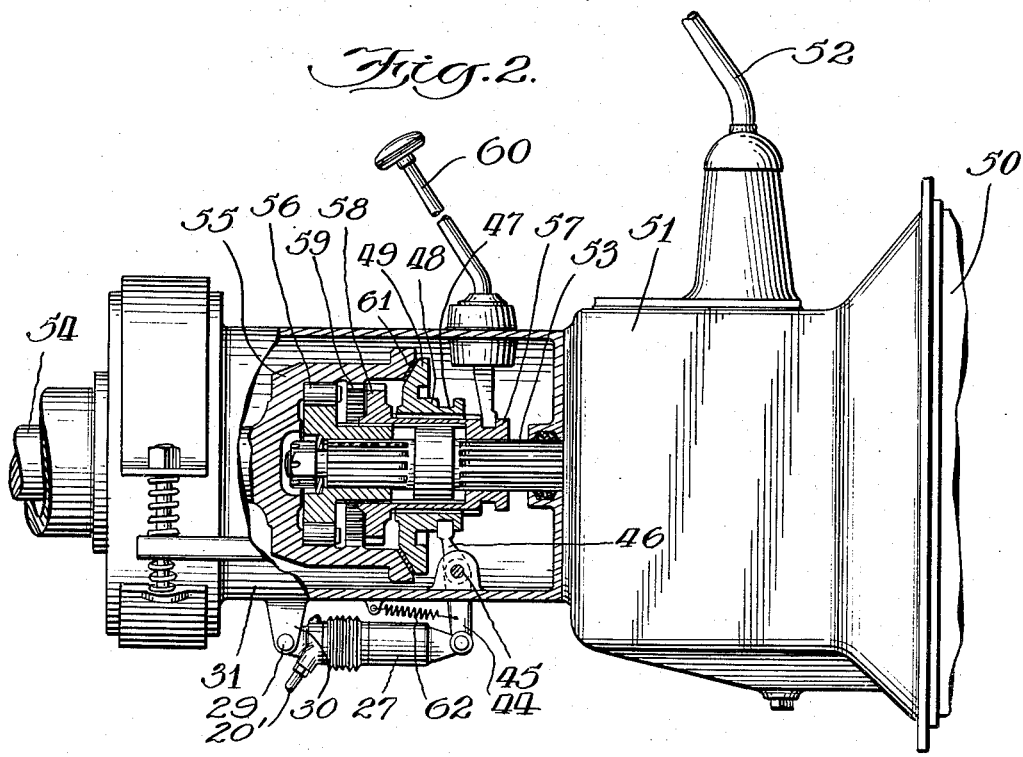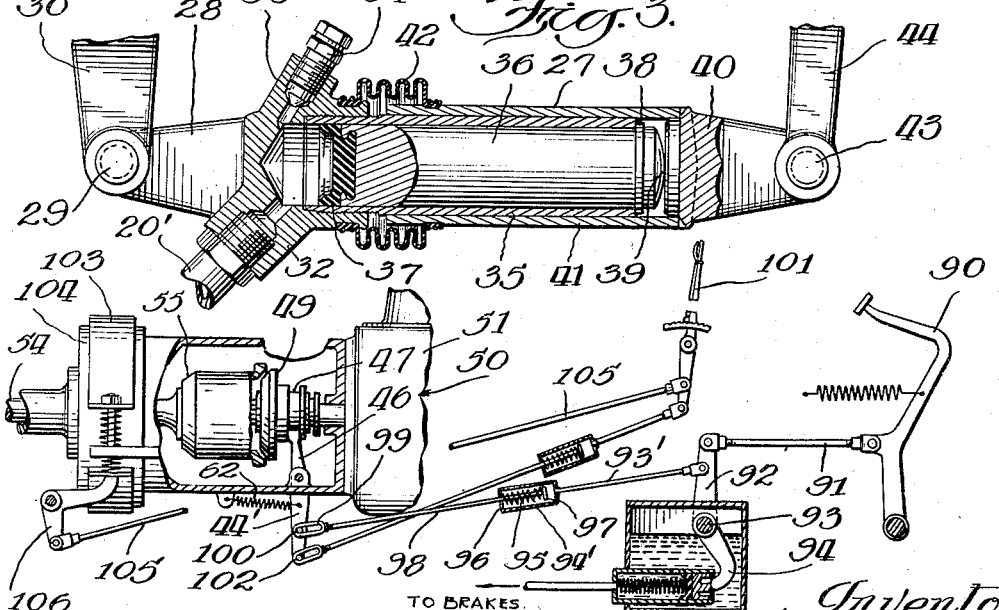

Patented May 11, 1937

2,080,196

UNITED STATES PATENT OFFICE 2,080,196

BRAKING MECHANISM

Myron W. Bowen, Detroit, Mich., assignor to Hydraulic Brake Company, Detroit, Mich., a corporation of California Application March 9, 1932, Serial No. 597,696

7 Claims. (Cl. 192—13)

My invention pertains to braking mechanism and is particularly concerned with braking mechanism for use on automotive vehicles equipped with so-called "free wheeling" devices.

Within the past year it has become common practice for automobile manufacturers to equip their products with so-called "free wheeling" devices. These devices are, in essence, a one way clutch which permits the vehicle motor to drive the vehicle wheels but which prevents the vehicle wheels from driving the motor when the machine is coasting with the transmission shift lever located in one of the forward speeds. With such a free wheeling device in operation, no braking effort is exerted by the automobile motor and the entire braking effort must be exerted by the braking mechanism. This means greatly increased wear on the braking mechanism and requires larger and more effective braking mechanism.

Furthermore, where the motor of the vehicle is positively connected to the driving wheels the motor not only exerts an appreciable braking effort, but it also serves to equalize the braking effect on the rear wheels of the vehicle, acts to prevent locking of these wheels, and is of material assistance in preventing skidding and loss of control of the vehicle.

An object of my invention is to provide means for frictionally connecting the motor of the vehicle to the driving wheels upon each application of the brakes and thereby obtain the braking effort and equalizing effect which results from a positive connection between the motor and the driving wheels of the vehicle.

Another object is to accomplish this automatically without any appreciable additional effort on the part of the driver.

Another object is to provide simple, inexpensive and durable mechanism for accomplishing this result.

Other objects and advantages will become apparent as the description proceeds.

In the drawings,

Fig. 2 is an enlarged view of the free wheeling device and coordinated mechanism shown in Fig. 1;

Fig. 3 is an enlarged view of the hydraulic cylinder which actuates the free wheeling lockout;

Fig. 5 is a diagrammatic view of combined hydraulic and mechanical braking mechanism incorporating my invention.

Figure 1:
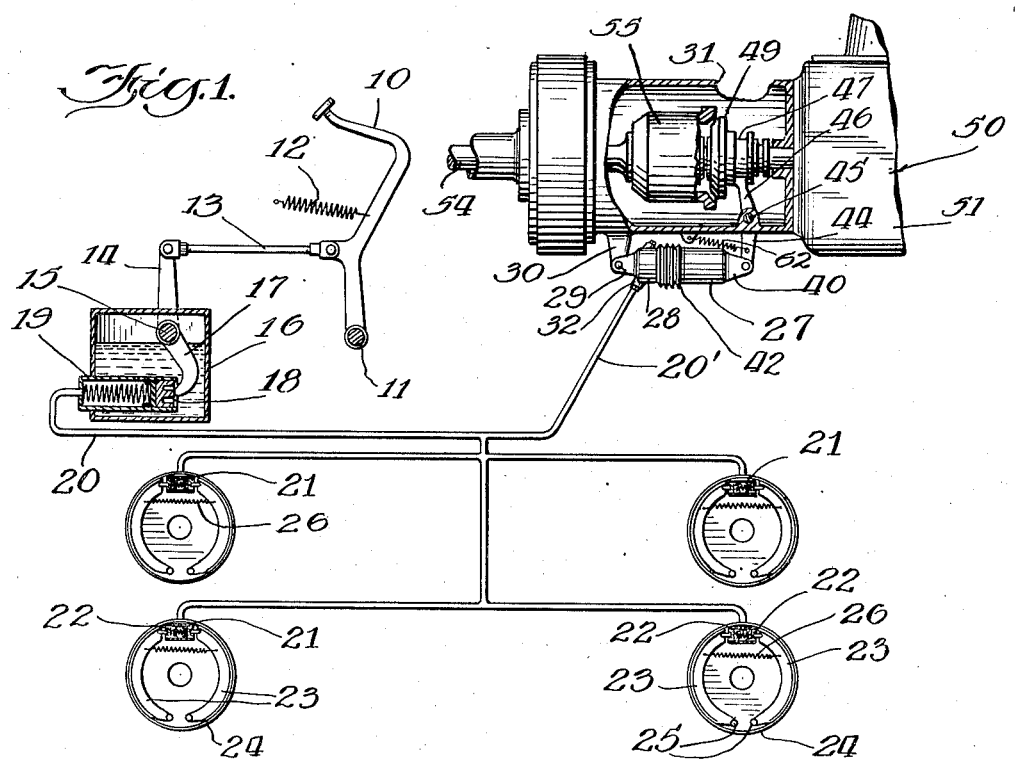
Fig. 1 is a diagrammatic view of a hydraulic braking mechanism incorporating my invention.

In Fig. 1 of the drawings I have indicated the usual brake pedal 10 as being pivoted at 11 and having the usual return spring 12. The brake pedal 10 is connected to a link 13 which in turn is connected to a lever 14 on one end of a shaft 15 which extends into a reservoir 16 and has an arm 17 for operating a piston 18 located in a master cylinder 19. The master cylinder and reservoir unit are preferably of the type shown in Loughead and Loweke Patent No. 1,758,671 and need not be described in further detail.

A conduit system 20 connects the master cylinder 19 with the wheel cylinders 21 which contain opposed pistons 22 for moving brake shoes 23 into engagement with brake drums 24. The brake shoes are pivoted at 25 and are normally held in retracted position by retractile springs 26.

The conduit system 20 has a branch 20' leading to a cylinder 27 which actuates the means for rendering the free wheeling device inoperative during the braking operation. This cylinder and the mechanism actuated thereby are shown more clearly in Figs. 2 and 3. The cylinder comprises a casting 28 which is pivoted at 29 to a supporting bracket 30 which may be integral with the housing 31 of the free wheeling device. The casting 28 has an inlet 32 which is connected with the branch 20', and the casting is also provided with a bleed opening 33 which is normally closed by a bleed screw 34.

A cylindrical sleeve 35 is threadedly engaged with the casting 28 and forms the major portion of the operating cylinder. A piston 36 is located in the sleeve 35 and is provided with a suitable cup washer 37. The rear of the piston 36 is provided with a flange 38 which normally rests against the end of the sleeve 35 and acts as a stop to limit inward movement of the piston. The extreme rear of the piston is rounded as indicated at 39, and rests against the closed end of a casting 40 provided with a sleeve-like extension 41 which telescopes with the sleeve 35. The telescoping sleeves 35 and 41 are preferably made relatively long in order to prevent binding of the parts. A flexible boot 42 covers the gap formed between the end of the sleeve 41 and the adjacent end of the casting 28 and functions to exclude dirt and moisture.

The casting 40 is pivoted at 43 to a lever 44 attached to a shaft 45 which extends into the housing 31 through a suitable oil-tight packing (not shown). The shaft 45 is provided with a bifurcated arm 46 provided with ends which engage in a groove 47 formed in the collar 48 of a clutch member 49.

I have indicated the vehicle motor 50 as provided with the usual transmission 51 having a conventional gear shift lever 52. Immediately in rear of the transmission 51 is the housing 31 containing the free wheeling device which is interposed between the transmission shaft 53 which is connected through the transmission with the vehicle motor, and the adjacent end of the propeller shaft 54 which is connected with the vehicle wheels.

The end of the propeller shaft is cup-shaped as indicated at 55, and a one-way roller clutch 56 functions as a one-way driving connection between the cup-shaped end 55 of the propeller shaft and the transmission shaft 53. A sleeve 57 is splined to the transmission shaft 53 and carries a gear 58 which may be moved into engagement with internal teeth 59 formed on the cup-shaped end 55 of the propeller shaft to render the one-way clutch 56 inoperative. Movement of the sleeve 57 is effected through manual control 60.

The collar 48 is splined to the sleeve 57 and therefore rotates with the transmission shaft 53 so that when the friction material 61, carried by the clutch member 49, is brought into engagement with the cup-shaped end 55 of the propeller shaft 54, a rigid driving connection is established between the transmission shaft 53 and the propeller shaft 54 which will permit the automobile motor to exert an equalized braking effort on the vehicle wheels and thus assist in slowing down the forward motion of the vehicle. A spring 62 normally holds the clutch member 49 in disengaged position and maintains the piston 36 in the position shown in Fig. 3.

The operation of this form of my invention is as follows: When the driver desires to retard the forward progress of the vehicle, he depresses the pedal 10, thereby advancing the piston 18 in the cylinder 19 and discharging fluid into the conduit system 20. This builds up a pressure in the conduit system and this pressure acts on the piston 36 in the cylinder 27 and moves the piston to the right as viewed in the drawings. This movement of the piston moves the clutch member 47 toward the left and brings the friction material 61 carried thereby into engagement with the cup-shaped end of the propeller shaft 54, thereby establishing a non-slipping connection between the propeller shaft and the vehicle motor which permits the motor to act as a brake by exerting a retarding effect on the driving wheels of the vehicle, thus reducing wear on the braking elements and adding to the safety of the vehicle by reducing the likelihood of skidding.

The pressure created in the conduit system 20 also acts on the pistons 22 in the wheel cylinders 21, thereby applying the brake shoes 23 against the brake drums 24. As soon as the driver releases his foot from the pedal 10, the pressure in the conduit system is reduced and the retractile springs 26 return the brake shoes 23 to off position. The spring 62 thereupon disengages the clutch member 49 from contact with the cup-shaped end of the propeller shaft and returns this clutch member and piston 36 to their initial retracted positions, thus permitting the one-way roller clutch 56 to function as a free wheeling device.

It is particularly desirable to obtain the braking and equalizing effect of the automobile motor on a light application of the brakes, and I therefore prefer to so design the mechanism that the clutch member 49 is brought into engagement with the end of the propeller shaft 54 before the brake shoes 23 are brought into engagement with their brake drums 24. The retractile springs 26 are relatively strong and it is usually necessary to build up a pressure of approximately 50 pounds per square inch in the conduit system and wheel cylinders in order to move the brake shoes into engagement with the brake drums against the tension of these retractile springs. I therefore preferably make the cylinder 27 of such size relative to the spring 62 that a pressure less than 50 pounds per square inch will move the clutch member 49 into effective engagement with the end of the propeller shaft 54.

Figure 4:
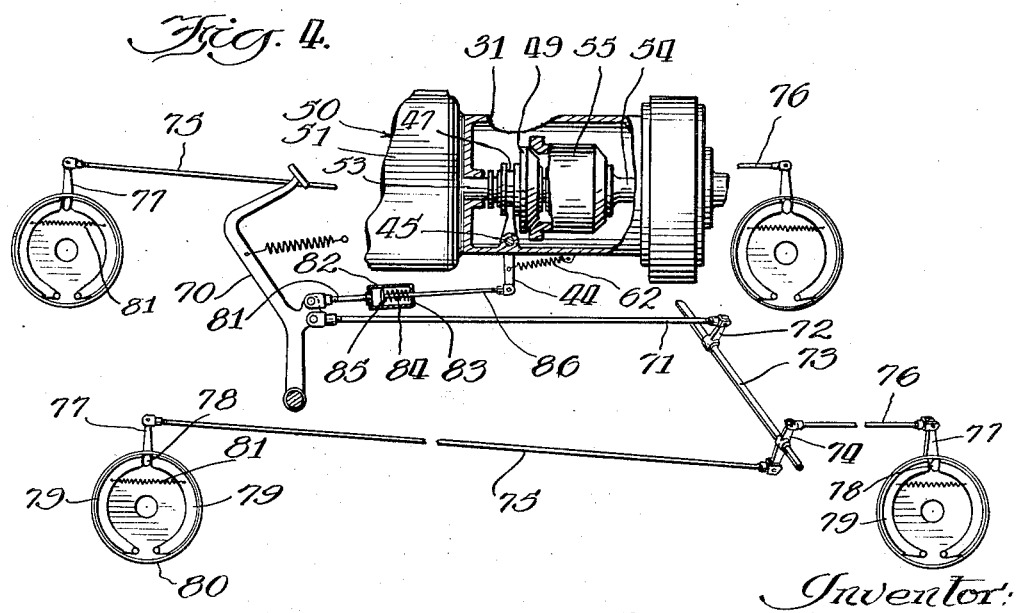
Fig. 4 is a diagrammatic view of a mechanical braking mechanism incorporating my invention.

In Fig. 4 I have shown my invention as adapted for use with a mechanical braking system. In this form of my invention the foot pedal 70 operates a pull rod 71 connected to an arm 72 on a cross shaft 73. The cross shaft 73 is provided with levers 74 connected to pull rods 75 and 76 leading to the front and rear brakes. The rods 75 and 76 are connected to cam levers 77 which actuate cams 78 to spread the brake shoes 79 into engagement with the brake drums 80. The brake shoes are returned to off position by retractile springs 81. The foot pedal 70 is also pivotally connected to a link 81 which has an adjustable threaded connection with the bottom of a cup 82. The open end of the cup is closed by an annulus 83 which is threaded or otherwise suitably secured to the cup 82 and which forms an abutment for a spring 84, the other end of which rests against a nut 85 on a rod 86. The rod 86 is connected to lever 44 and moves the clutch member 49 into and out of engagement with the cup-shaped end 55 of the propeller shaft 54 as previously described.

In this embodiment of my invention the rods 81 and 86 are so adjusted in length that the clutch member 49 is brought into engagement with the cup-shaped end 55 of the propeller shaft by the initial movement of the brake pedal, so that the engine commences to exert its braking effect before the brake shoes 79 produce any effective braking action. Thereafter the spring 84 yields to permit further depression of the foot pedal 70, with resulting increased pressure on the brake shoes 79.

In Fig. 5 I have shown a still further adaptation of my invention in which both the hand brake and the foot brake are connected to my novel means for rendering the free wheeling device inoperative. In this embodiment of my invention the foot pedal 90 is connected to a link 91 leading to a lever 92 on a shaft 93 having an arm 94 for operating the piston in the master cylinder of a hydraulic brake system. All of the mechanism so far described is identical with that described in connection with the embodiment shown in Fig. 1. In the present embodiment, however, the arm 44' which operates the clutch member 49 is mechanically connected with the master cylinder operating lever 92 through a mechanical linkage instead of being operated by a hydraulic cylinder. Thus the lever 92 is connected to a link 93' attached to the base of cup 94' in which is located a compression spring 95 interposed between an annular washer 96 threaded into the open end of the cup, and a nut 97 on the adjacent end of rod 98 which is provided with a slot 99 for receiving a pin 100 attached to lever 44'.

A similar mechanical linkage connects hand brake lever 101 with a second pin 102 also attached to the lever 44'. In this particular embodiment the hand brake is illustrated as comprising a band 103 operating on a drum 104 attached to the propeller shaft of the vehicle and operated from the hand brake lever 101 through the medium of a pull rod 105 and suitable bell crank 106.

The operation of this embodiment is the same as the operation of the embodiments previously described except that in this particular embodiment of my invention the clutch member 49 is actuated by both the foot and hand brake levers.

It will of course be apparent that if the driver of the vehicle so desired and had time to do so, he could first shift the hand lever 60 so that the gear 58 would engage the teeth 59 on the end of the propeller shaft, thus locking out the free wheeling clutch, and then apply the brakes. However, in order to accomplish this in free wheeling devices as at present marketed, it is first necessary to depress the clutch before the gear 58 can be engaged with the teeth 59, which means that the operator would have to go through two additional movements before applying the brake and also two additional movements after the braking action was terminated in order to get back into free wheeling. In addition to the extra effort and thought which this would require on the part of the driver, it would also require additional time and the use of one arm, whereas in many brake applications speed is of the utmost importance and it is also extremely important that the driver have both hands free to manipulate the steering wheel. My invention therefore greatly simplifies the work on the part of the driver by automatically rendering the free wheeling device ineffective during the brake application and automatically rendering it again effective upon the cessation of such brake application. All of this is done without any additional effort or thought on the part of the driver and leaves both of his hands free to operate the steering wheel and give signals of turns, stops or other movements which he may desire to make.

While I have illustrated and described three embodiments of my invention, it is to be understood that my invention is capable of assuming numerous forms, and that the scope of my invention is limited solely by the following claims.

I claim:

1. In an automotive vehicle having a driving mechanism including a one way clutch, the combination of a first braking means, a lever for operating said means, a second braking means, a second lever for operating said second braking means, means for rendering said one way clutch ineffective, and connections between said last-named means and said levers.

2. In mechanism of the class described, the combination of a master cylinder, means for operating said cylinder, brake applying cylinders connected with said master cylinder and actuated thereby, power transmitting mechanism including a member shiftable to different positions including a two-way clutching position, a cylinder for shifting said member, and a conduit connecting said last-named cylinder with said other cylinders whereby said member is moved to two-way clutching position when the brakes are applied.

3. In a motor vehicle, the combination of a driving shaft, a propeller shaft having a cup-shaped end surrounding an end of said driving shaft, a one way clutch located in said cup and connecting said shafts, a clutch member rotating with said driving shaft and adapted to be brought into driving engagement with the end of said cup, a braking system for said vehicle, and a connection between said braking system and said clutch member whereby said clutch member engages said cup upon each application of the brakes.

4. In a motor vehicle of the class described, the combination of a driving shaft, a propeller shaft having a cup-shaped end surrounding an end of said driving shaft, a one-way clutch located in said cup and connecting said shafts, a two-way clutch located in said cup and adapted to connect said shafts, a clutch member rotating with said driving shaft and adapted to be brought into driving engagement with the end of said cup, and means for operating said two-way clutch and said clutch member.

5. In a motor vehicle of the class described, the combination of a driving shaft, a driven shaft, one of said shafts having a cup-shaped end surrounding an end of the other shaft, a one-way clutch located in said cup and connecting said shafts, a two-way clutch located in said cup for connecting said shafts, a second two-way clutch formed partly by the end of said cup and partly by a friction member associated with said other shaft, and separate means for operating said two-way clutches.

6. In a motor vehicle of the class described, the combination of a driving shaft, a driven shaft, one of said shafts having a cup-shaped end surrounding an end of the other shaft, a one-way clutch connecting said cup with said other shaft, a sleeve splined on said other shaft and carrying a two-way clutch element engageable with a cooperating part of said cup, a disk splined on said sleeve and engageable with the end of said cup to form a two-way clutch, and means for shifting said sleeve and said disk.

7. In an automobile driving mechanism, a driving friction clutch member, a driving shaft attached to and revoluble with said clutch member, a rotary driven member, a lock up member revoluble with said clutch member and said shaft but movable independently thereof into and out of rigid locking engagement with said driven member, free wheeling means connecting said shaft with said driven member operative independently of said clutch member and said lock up member, a driven friction clutch member revoluble with said driven member and engageable with said driving clutch member independently of said free wheeling means and said lock up member, manually operated for engaging said friction clutch members, and manually operated means for so moving said lock up member.

MYRON W. BOWEN.